United States Patent
Ali et al.

(10) Patent No.: US 8,518,218 B2
(45) Date of Patent: Aug. 27, 2013

(54) APPARATUS FOR DECOMPOSING RUBBER PRODUCTS THROUGH PYROLYSIS

(75) Inventors: Mazlan Ali, Taman Setiawangsa (MY); Siti Fatimah Mohd Shariff, Taman Setiawangsa (MY); Christopher John Webb, Newbury (GB)

(73) Assignee: Advanced Pyrotech SDN. BHD., Kuala Lumpur (MY)

( * ) Notice: Subject to any disclaimer, the term of this patent is extended or adjusted under 35 U.S.C. 154(b) by 0 days.

(21) Appl. No.: 13/382,884

(22) PCT Filed: Jul. 15, 2010

(86) PCT No.: PCT/MY2010/000122
§ 371 (c)(1),
(2), (4) Date: Jan. 18, 2012

(87) PCT Pub. No.: WO2011/008074
PCT Pub. Date: Jan. 20, 2011

(65) Prior Publication Data
US 2012/0111716 A1    May 10, 2012

(30) Foreign Application Priority Data

Jul. 17, 2009  (MY) .............................. PI 20093008

(51) Int. Cl.
*C10B 7/06*    (2006.01)
*C10B 53/07*   (2006.01)

(52) U.S. Cl.
USPC ............................ 202/117; 202/118; 202/247

(58) Field of Classification Search
USPC ..................... 201/8, 15, 25, 30, 35; 202/117, 202/118, 247
See application file for complete search history.

(56) References Cited

U.S. PATENT DOCUMENTS

| | | | | |
|---|---|---|---|---|
| 4,084,521 A | * | 4/1978 | Herbold et al. | 110/242 |
| 4,284,616 A | * | 8/1981 | Solbakken et al. | 423/449.7 |
| 4,686,008 A |   | 8/1987 | Gibson | |
| 4,839,151 A | * | 6/1989 | Apffel | 423/449.7 |
| 4,983,278 A | * | 1/1991 | Cha et al. | 208/407 |
| 5,082,534 A |   | 1/1992 | Breu | |
| 5,167,772 A |   | 12/1992 | Parker, Sr. | |
| 5,286,374 A | * | 2/1994 | Chen | 208/400 |
| 5,437,237 A | * | 8/1995 | Digre | 110/346 |
| 5,894,012 A | * | 4/1999 | Denison | 422/150 |
| 6,221,329 B1 | * | 4/2001 | Faulkner et al. | 423/445 R |
| 6,736,940 B2 | * | 5/2004 | Masemore et al. | 201/25 |
| 7,264,694 B2 | * | 9/2007 | Merrell et al. | 202/105 |
| 7,329,329 B2 | * | 2/2008 | Masemore et al. | 202/117 |
| 7,416,641 B2 | * | 8/2008 | Denison | 202/99 |
| 7,959,890 B2 | * | 6/2011 | MacIntosh et al. | 423/449.7 |
| 2007/0227417 A1 |   | 10/2007 | Aguayo et al. | |
| 2008/0128259 A1 | * | 6/2008 | Kostek et al. | 201/4 |
| 2010/0276271 A1 | * | 11/2010 | Dinnematin | 201/25 |

FOREIGN PATENT DOCUMENTS

| WO | 2006/119594 A1 | 11/2006 |
|---|---|---|
| WO | 2007/142441 A1 | 12/2007 |

* cited by examiner

*Primary Examiner* — Nina Bhat
(74) *Attorney, Agent, or Firm* — Maschoff Brennan

(57) ABSTRACT

A carbonization reactor to decompose used rubber products and the like by heating the rubber products under constant high temperature and the reactor comprise a conveyor which continuously move and drag the rubber products through cylinders where the decomposition process takes place to produce recyclable by products such as carbon black, oil vapor and the like.

8 Claims, 1 Drawing Sheet

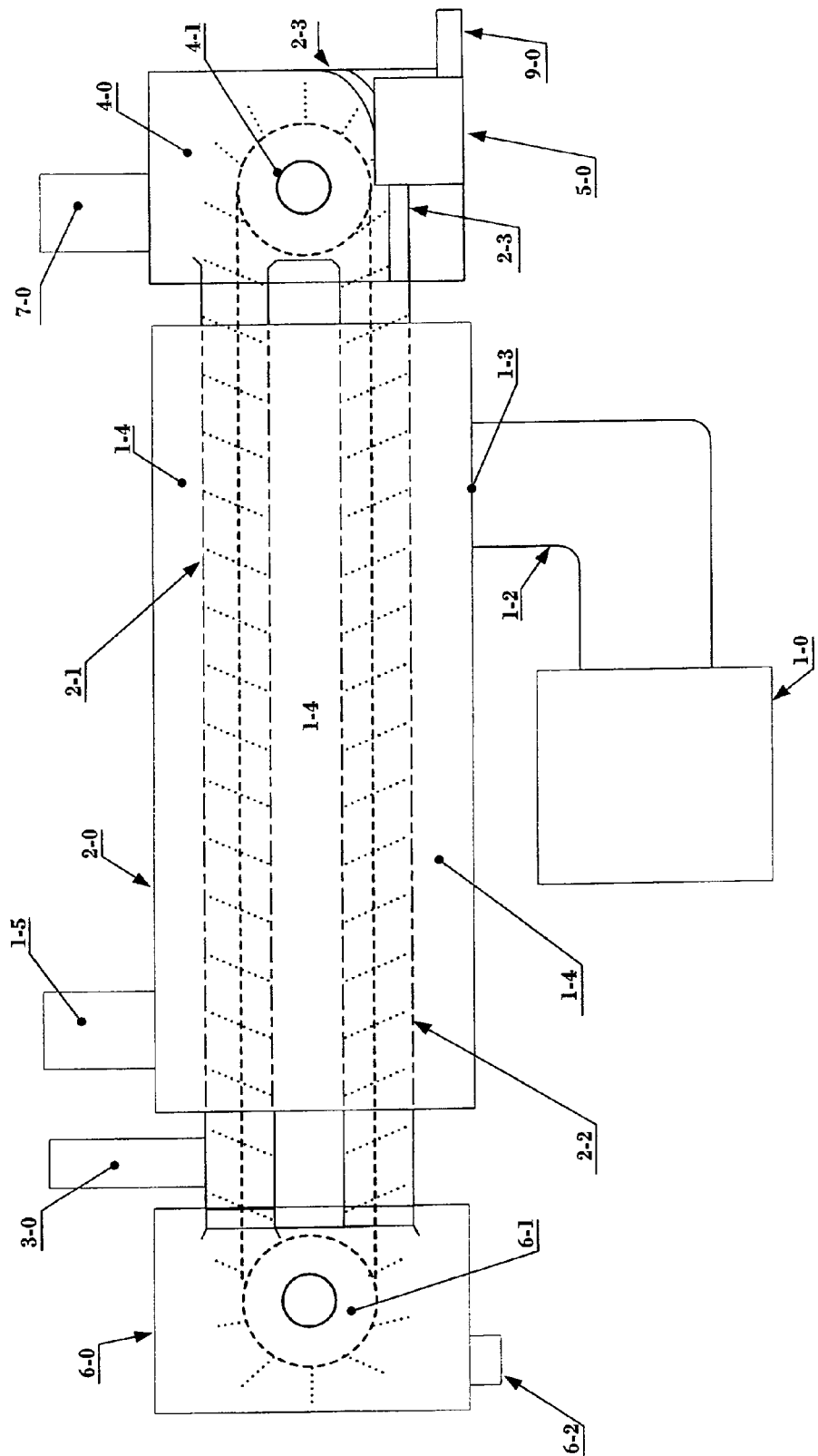

APPARATUS FOR DECOMPOSING RUBBER PRODUCTS THROUGH PYROLYSIS

FIELD OF INVENTION

The present invention relates to an apparatus for decomposing rubber products through pyrolysis.

BACKGROUND OF INVENTION

In the destruction of rubber products such as used tyres and the like, numerous types of systems have been employed, some with unfavourable results. One of such system is blending shredded used tyres to become surface materials which are experiencing a depleting in demand. Used tyres have and will continue to become a waste hazard that proves difficult to deal with a waste that cannot be combusted without extensive flue gas treatment due to the generation of noxious gases e.g. hydrogen sulfide.

Current systems only process shredded used tyres in batches due to limiting operating capacity such as the time needed to load and unload such used tyres.

Therefore there is a need of a system which is able to destroy used rubber products more effectively and efficiently as the volume of used rubber products is rising at an alarming rate.

SUMMARY OF INVENTION

Accordingly, the present invention provides an apparatus for decomposing rubber products through pyrolysis, (a) a thermal inlet for receiving thermal energy to heat up the apparatus under a controlled temperature, (b) a feed port for receiving inlet products, (c) an outlet port for discharging carbonized products, (d) an outlet duct for extracting oil vapour and synthesis gas after the inlet product is partially composed, (e) a first cylinder to partially decompose the inlet product, (f) a second cylinder to completely decompose the inlet product and (g) a conveyor means to move and drag inlet products through to the first cylinder and the second cylinder wherein in operation, said conveyor means is continuously moving and dragging said inlet products from said feed port through said first cylinder and through said second cylinder and re-enters said feed port to further collect inlet products to be decomposed.

The present invention consists of several novel features and a combination of parts hereinafter fully described and illustrated in the accompanying description and drawing, it being understood that various changes in the details may be made without departing from the scope of the invention or sacrificing any of the advantages of the present invention.

BRIEF DESCRIPTION OF THE DRAWING

The embodiment of the invention will now describe, by way of example only, with reference to the accompanying figure in which:

FIG. 1 illustrates the apparatus for decomposing rubber products according to the preferred embodiment of the present invention.

DETAILED DESCRIPTION OF THE PREFERRED EMBODIMENTS

The present invention relates to an apparatus for decomposing rubber products through pyrolysis. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

For a better understanding of the invention, FIG. 1 relates to a carbonization reactor (1-0) for decomposing used rubber products such as used rubber tyres and the like.

Although the description hereinafter refers to used rubber products such as rubber tyres and the like, it is understood that the invention can be used to decompose unused rubber products such as used rubber tyres or unused rubber products such as unused rubber tyres with defects, or a combination of both.

The used rubber products herein referred as the inlet product is fed into the reactor (1-0) at an entry duct or feed port (3-0) from a continuously feeding conveyor and falls by gravity onto a continuously rotating conveyor means or drag chain conveyor (2-0). The inlet product is then dragged by the continually moving drag chain conveyor (2-0) which, at a controlled speed, conveys the inlet product through an upper conveying transfer cylinder or a first cylinder (2-1).

As the inlet product is drawn through the upper conveying cylinder (2-1) its temperature is increased by thermal energy being transferred from high temperature air circulated through the void surrounding the conveying transfer cylinders (2-1, 2-2). The conveying transfer cylinders (2-1, 2-2) are sealed from the void surrounding them and operate under partial vacuum i.e. oxygen is below its stoichiometric level to permit combustion; hence the inlet product chemically decomposes through a pyrolysis process. The pyrolysis process transforms the inlet product into carbon black, oil vapour and syngas leaving the residual steel wire that was contained in the shredded inlet product as the only original faction.

Transformation of the inlet product is completely achieved in the reactor due to the specified length of the main body (2-0) and the time the inlet product is conveyed by drag chain conveyor (2-4) which loops back on itself in the shape of a 'rounded rectangle' in a controlled high temperature environment.

The looping path of the drag chain conveyor (2-0) is achieved by the drag chain being captured by a drive sprocket (4-1) which is driven by a variable speed motor (5-0). The drive end (4-0) of the reactor is located at one end and the drag chain motion is maintained on a fixed path of travel through the conveying transfer cylinders (2-1, 2-2) by a freewheeling sprocket (6-1) at the opposite end.

The inlet product is fed onto the drag chain conveyor (2-0) at a feed port (3-0) located at the same end as the freewheeling sprocket (6-1). The thermal energy from a heat generator (10-0) enters the reactor void space (1-4) via a purpose designed refractory lined transfer duct (1-2), the thermal energy maintains a heat transfer rate, with a circulating air temperature within the reactor between about 500° C. to about 800° C., at the thermal inlet (1-3) to the reactor being located at the opposite end to the inlet product entry (3-0) and in the void space (1-4) of the invention. These opposing entries of the inlet product and the thermal energy provide a contra-flow path which, by adjusting the rate of feeding the inlet product at the inlet product entry (3-0) and the travel rate (rotation) of the drag chain conveyor (2-0) the extraction of oil vapour and syngas from the inlet product by the pyrolysis process is maximised.

As the partially decomposed inlet product enters the drive end (4-0) of the reactor the oil vapour and syngas that have been extracted from the inlet product are drawn out of the invention via the oil vapour/syngas outlet duct (7-0) located at the top of the reactor drive end section (4-0).

The drag chain conveyor (2-0) at the drive end (4-0) exits from the upper conveying cylinder (2-1) into the reactor drive section (4-0), the partially de-composed inlet product will fall from the drag chain conveyor into a catch tray (4-2) fixed at the base of the reactor drive section (4-0). The catch tray (4-2) is designed to capture the partially de-composed inlet product and funnel it to the center of the catch tray (4-2). The diameter of catch tray (2-3) is slightly larger than the plates of the drag chain conveyor (2-0). The drag chain conveyor (2-0) is moved round the drive sprocket (4-1) and in doing so collects the partially de-composed inlet product that fell into the catch tray (2-3) and drags this into a lower conveying cylinder or a second conveying cylinder (2-2).

As the drag chain conveyor (2-0) is a continuously moving conveyor it drags the partially decomposed inlet product through the second conveying transfer cylinder or the lower conveying cylinder (2-2) until it reaches the outlet of the lower conveying cylinder (2-2) located in the drive free wheel section (6-0) at which point, due to the variable speed at which the inlet product was conveyed though the reactor, the control of temperature inside the reactor, the transfer of thermal energy from the thermal energy section (1-3) to the conveying cylinders (2-1, 2-2), and the maintaining of a partial vacuum in the conveying cylinders of the reactor, the inlet product is now completely decomposed into carbon black together with any residual steel wire that remained in the inlet product at the time of being fed into the reactor.

On entering the freewheeling drive section (6-0) the carbon black and residual steel will fall from the drag chain (2-0) into the de-composed product outlet (6-2) at the base of freewheeling drive section (6-0). The drag chain continues to loop over the free-wheeling sprocket (6-1) so that it re-enters the upper conveying cylinder (2-1) and collects further inlet product to be decomposed thus completing and continuing the carbonization process of the inlet product.

The invention incorporates all necessary temperature, pressure, level and flow instrumentation and control for operating the reactor and to provide protection against upset operational conditions. Safety features are also designed into the reactor for prevention and/or reaction to over and under pressure conditions.

It should be understood that various changes, adaptations and modifications may be made thereto without departing from the gist of the invention and the scope of the claim. It should be understood; therefore, that the invention is not limited to details as illustrated and shown in the figures and that it may include variations as will be apparent to one skilled in the art.

The invention claimed is:

1. A continuous fed pyrolysis reactor for decomposing rubber products through pyrolysis, the continuous fed pyrolysis reactor includes:
   a thermal inlet for receiving thermal energy to heat up the continuous fed pyrolysis reactor under a controlled temperature;
   a feed port for receiving inlet products;
   an outlet port for discharging carbonized products;
   an outlet duct for extracting oil vapour and synthesis gas after the inlet product is partially decomposed;
   a first cylinder to partially decompose the inlet product;
   a second cylinder to completely decompose the inlet product;
   a chamber including a void surrounding the sealed first and second cylinder, wherein air is circulated within the void of the chamber to heat the first and second cylinder; and
   a conveyor means to move and drag inlet product through to the first cylinder and the second cylinder, wherein:
      the first cylinder and the second cylinder are sealed and operate under partial vacuum to chemically decompose the inlet product;
      temperature of circulating air within the continuous fed pyrolysis reactor is between about 500° C. to about 600° C.; and
      in operation, the conveyor means is continuously moving and dragging the inlet product from the feed port through the first cylinder and through the second cylinder and re-enters the feed port to further collect inlet product to be decomposed.

2. The continuous fed pyrolysis reactor as claimed in claim 1, wherein the rubber products are used rubber products including used rubber tires or unused rubber products or unused rubber tires with defects, or a combination of thereof.

3. The continuous fed pyrolysis reactor as claimed in claim 1, wherein the thermal inlet is located opposite the feed port to provide a contra-flow path of thermal energy.

4. The continuous fed pyrolysis reactor as claimed in claim 1, wherein the inlet product is shredded before entering said feed port.

5. The continuous fed pyrolysis reactor as claimed in claim 1, wherein the conveyor means is continuously moving at a controlled and variable speed to achieve maximum carbonization of the Inlet product.

6. The continuous fed pyrolysis reactor as claimed in claim 1, wherein the conveyor continuously moving in a loop-like motion by moving under a freewheeling sprocket which is located at the same and as the feed port to continuously collect said Inlet product to be decomposed.

7. The continuous fed pyrolysis reactor as claimed in claim 1, wherein the conveyor includes a drag chain conveyor that loops back in a continuous shape of a rounded rectangle in a controlled high temperature environment so as to continuously feed the inlet product through the first cylinder disposed at the top of the rounded rectangle and the second cylinder disposed at the bottom of the rounded rectangle.

8. A continuous fed pyrolysis reactor for decomposing rubber products through pyrolysis, the continuous fed pyrolysis reactor includes:
   a thermal inlet for receiving thermal energy to heat up the continuous fed pyrolysis reactor under a controlled temperature;
   a feed port for receiving inlet products;
   an outlet port for discharging carbonized products;
   an outlet duct for extracting oil vapour and synthesis gas after the inlet product is partially decomposed;
   a first cylinder to partially decompose the inlet product;
   a second cylinder to completely decompose the inlet product;
   a chamber including a void surrounding the sealed first and second cylinder, wherein air is circulated within the void of the chamber to heat the first and second cylinder; and
   a conveyor means to move and drag inlet product through to the first cylinder and the second cylinder, wherein:
      the first cylinder and the second cylinder are sealed and operate under partial vacuum to chemically decompose the inlet product;
      temperature of circulating air within the continuous fed pyrolysis reactor is between about 500° C. to about 600° C.; and
      in operation:
         the conveyor means is continuously moving and dragging the inlet product from the feed port through the first cylinder and through the second cylinder and re-enters the feed port to further collect inlet product to be decomposed; and the conveyor loops back in a continuous shape of a rounded rectangle in a controlled high temperature environment so as to continuously feed the inlet product through the first cylinder disposed at the top of the rounded rectangle and the second cylinder disposed at the bottom of the rounded rectangle.

* * * * *